United States Patent [19]

Dudley

[11] 3,709,508
[45] Jan. 9, 1973

[54] CHUCK ASSEMBLY WITH CENTRIFUGAL COLLET
[75] Inventor: Francis Dudley, Torrance, Calif.
[73] Assignee: Excellon Industries, Torrance, Calif.
[22] Filed: Nov. 12, 1970
[21] Appl. No.: 88,610

[52] U.S. Cl. .................................279/1 C, 279/66
[51] Int. Cl. ............................................B23b 31/14
[58] Field of Search......279/1 C, 17, 18, 66, 110, 76, 279/96, 102

[56] References Cited

UNITED STATES PATENTS

| 3,467,404 | 9/1969 | Sloan | 279/66 |
|---|---|---|---|
| 3,573,876 | 4/1971 | Powell | 279/1 C |
| 3,252,667 | 5/1966 | Miller | 279/1 C |
| 3,495,844 | 2/1970 | Dee | 279/35 |

Primary Examiner—Andrew R. Juhasz
Assistant Examiner—Z. R. Bilinsky
Attorney—Gausewitz, Carr & Rothenberg

[57] ABSTRACT

A cylindrical chuck has an axial bore for reception of a tool shank. A radially extending transverse chamber intersects the bore and contains a pair of collets. Each collet has a massive outer end and an inner wedge portion. The two wedge portions are oppositely disposed and each bears tangentially upon an oppositely disposed side of the tool shank. The collet pieces grip the tool shank and lock it to the chuck in response to a combination of centrifugal force, tool torsion and acceleration of the chuck. An arrangement of O-rings holds the several parts in assembled condition within the chuck and also retains the tool when the device is at rest.

26 Claims, 10 Drawing Figures

PATENTED JAN 9 1973 3,709,508

INVENTOR.
FRANCIS DUDLEY
BY Gausewitz, Carr
& Rothenberg
ATTORNEYS.

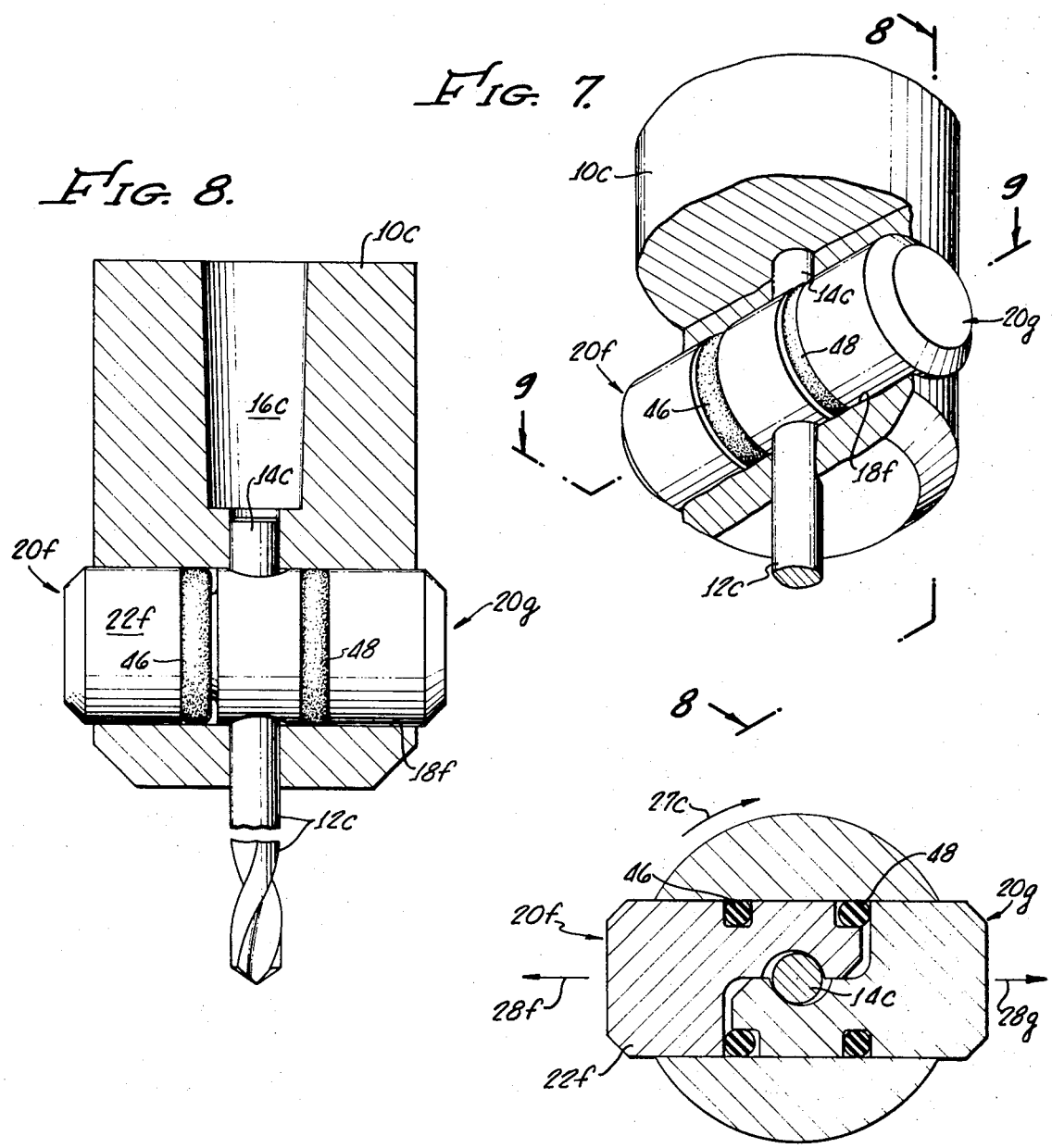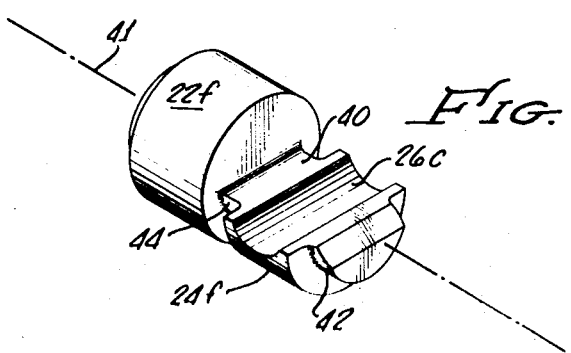

3,709,508

CHUCK ASSEMBLY WITH CENTRIFUGAL COLLET

BACKGROUND OF THE INVENTION

1. Field of the Invention

The present invention relates to tool holding devices and more particularly concerns a tool gripping action from a combination of forces that are exerted during rotation of the chuck.

2. Description of Prior Art

Various types of rotary cutting tools such as twist drills, rotary cutting heads and the like, are commonly operated from a rotationally driven chuck that is provided with some means for securely holding a shank of the tool. The common Jacobs key chuck provides a gear-driven gripping mechanism that has long established reliability and is widely used. Nevertheless, such a chuck requires a geared key for its operation and involves time and effort for tightening and loosening chuck collets for insertion and removal of a tool.

Many attempts have been made to employ centrifugal forces of chuck rotation for retaining a tool shank in a rotatable chuck. Devices of this kind are shown in numerous U.S. patents. U.S. Pat. Nos. 2,356,245, 2,431,961 and 2,394,861 are typical of those disclosing collet pieces that are pivoted or flexed by centrifugal force to grasp a tool. U.S. Pat. Nos. 1,990,525 and 2,495,050 show complex arrangements for employing a wedging action, not upon the tool itself, but upon the conventional tool holding collet. U.S. Pat. Nos. 885,392 and 3,467,404 are typical of those that provide a simplified operation using direct application of centrifugally generated force upon the tool itself. All of these arrangements are relatively complex, employing a large number of parts that are difficult to fabricate and assemble and will be subject to a high probability of jamming or other failure due to wear of the many parts or contamination of foreign material between the various parts.

In the centrifugally operated chuck of Sloan, U.S. Pat. No. 3,467,404, for example, a pair of weighted plugs is mounted to be urged radially outwardly upon rotation of the chuck. Each of the plugs has an aperture. The plug apertures are aligned with each other to receive a tool shank, whereby the tool shank is gripped in these apertures upon rotation of the chuck.

Centrifugally operated chuck assemblies of the prior art, including that of Sloan, can exert only gripping forces that are wholly dependent upon and directly related to the rotational speed of the chuck. For heavily loaded tools or for low rotational speeds, or some combination thereof, such gripping forces may not be sufficient to prevent rotation of the tool relative to the driving chuck assembly. Further, such devices are invariably complex, costly, and difficult to manufacture and assemble.

Accordingly, an object of the present invention is to provide a tool holding chuck assembly that derives an increased gripping ability from a combination of several different forces that act during chuck rotation and which assembly, nevertheless, is efficient, reliable, relatively inexpensive and capable of simplified manufacturing processes.

SUMMARY OF THE INVENTION

In carrying out principles of the present invention in accordance with a preferred embodiment thereof, a centrifugally driven wedge is mounted in a rotationally driven chuck for exerting a transverse holding force upon a tool carried by the chuck. The wedge includes an inner holding portion fixed to an outer massive portion and has a tool engaging surface inclined to the direction of outwardly urged motion of the wedge, to thereby exert a wedging action holding force in a direction that is angularly oriented with respect to the direction of outward urging of the wedge. In one arrangement that provides optimum dynamic balance and increased holding force, a second centrifugally driven wedge is also mounted in the chuck to exert a wedging action holding force on the tool shank in a direction that is opposed to the direction of the holding force exerted by the first wedge. Both torsion of the tool as it rotates in contact with the workpiece and acceleration of the chuck to rotational speed tend to draw the wedge into increasingly tightened contact with the tool to thereby supplement the tool holding action due to centrifugal forces in all described arrangements.

BRIEF DESCRIPTION OF THE DRAWINGS:

FIG. 7 is a pictorial illustration with parts broken away of another form of chuck assembly embodying principles of the present invention;

FIGS. 8 and 9 are sectional views of the embodiment of FIG. 7, and

FIG. 10 comprises a pictorial illustration of a single one of the two collet pieces of the assembly of FIG. 7.

Figure 1:
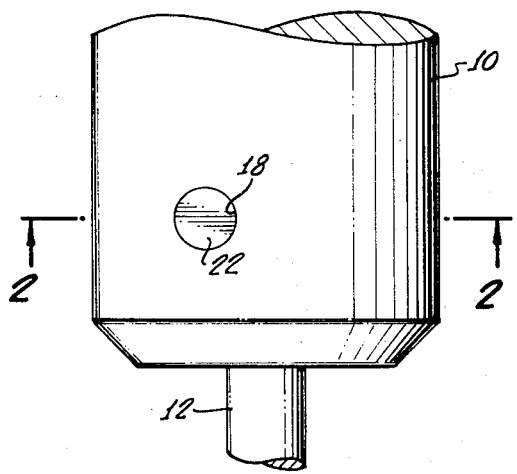
FIGS. 1 and 2 comprise elevational and sectional views of a simplified chuck assembly embodying principles of the present invention.
Figure 2:
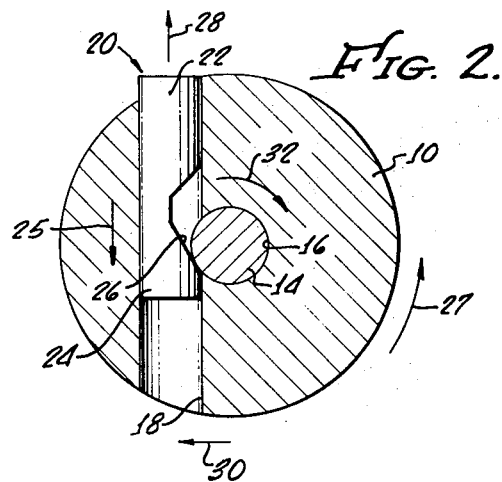

DETAILED DESCRIPTION:

As illustrated in FIGS. 1 and 2, a chuck assembly embodying certain principles of the present invention includes a chuck 10 that is adapted to hold and impart rotation to a rotary tool 12 having a shank 14. Shank 14 is preferably, but not necessarily, of circular cross-section. Chuck 10 may comprise a spindle or other cylindrical body that is integral with or fixedly attached by well known means to a driven shaft or other conventional rotational means (not shown) so as to impart rotation to the tool 12. The latter may comprise any conventional tool such as a twist drill, rotary cutter or the like, having a shank 14 that extends into an axial cylindrical bore 16 formed in the chuck body 10.

In this embodiment, tool shank 14 has a relatively close sliding fit within bore 16 of the chuck body. For the purpose of securely retaining the tool within the chuck for rotational drive of the tool, a collet bore or chamber 18 is formed within the chuck extending transversely therethrough and intersecting the tool receiving bore 16.

Slidably mounted within the chamber 18 for substantially radial motion with respect to the chuck is a centrifugally driven wedge 20 having an outer massive portion 22 and an inner tool holding or camming portion 24. Camming portion 24 is rebated or cut away to provide an inclined tool engaging surface 26.

As illustrated in FIG. 2, massive portion 22 of the collet piece 20 is offset substantially radially from the center of rotation of the chuck substantially in a direction along the radial extent of the chamber 18. Camming portion 24 of the collet is arranged so that its tool engaging surface 26 tangentially bears upon the tool shank 14 in an area thereof that is displaced from the center of rotation of the chuck in a direction normal to the substantially radial extent of the chamber.

Thus, as illustrated in FIG. 2, a rotational drive imparted to the chuck 10 in the direction of arrow 27 will produce centrifugal forces urging collet piece 20 outwardly of the chuck along the substantially radial extent of chamber 18 in the direction of arrow 28. The point of tangency of tool engaging surface 26 upon the tool shank 14 is offset from the center of rotation in a direction, indicated by arrow 30, which is substantially normal to the direction indicated by arrow 28.

Upon rotation of the chuck 10, collet piece 20 is centrifugally urged outwardly, thereby driving camming portion 24 of the collet more tightly between the outer wall of chamber 18 and the tool shank. Consequently, the tool is forced tightly against the surface of bore 16 where it is held against rotation relative to the chuck 10.

The described centrifugally driven wedge provides a greatly amplified centrifugally derived holding force because of the mechanical advantage achieved by the wedging action. The bearing force at the point of tangential contact of surface 26 and tool shank 14 is equal to the centrifugal force (exerted in the direction of arrow 28) divided by the sine of the angle between the surface 26 and the direction 28, this angle being the interwedge angle of camming portion 24. Accordingly, as the wedge angle is decreased, or as the surface 26 becomes more nearly parallel to the direction of arrow 28, the bearing force exerted by the wedge at the point of tangency increases. Note that for this wedging action to take place, the point of contact between tool engaging surface 26 and the tool shank 14 must be laterally offset from the center of rotation. Without such offset, the force exerted upon the tool shank can be no greater than the centrifugal force due to the rotational speed of the chuck and mass of the collet piece 20. The direction of force applied in the apparatus disclosed herein does not intersect the center of rotation as in prior devices that achieve only centrifugal holding forces directly applied. With the wedging arrangement illustrated in FIGS. 1 and 2, the collet piece may be made with a relatively small wedge angle for increased holding power at low rotational speeds. Where higher rotational speed tools are to be used, centrifugally driven wedge 20 may be replaced with a wedge of greater wedge angle.

The arrangement of FIGS. 1 and 2 provides a large mechanical advantage for a centrifugally generated holding force. This very same arrangement also takes advantage of two additional holding forces which accordingly supplement the holding force due to centrifugally derived wedging action. It will be noted, as seen in FIG. 2, that the tool engaging surface 26 inclines outwardly from the center of rotation as the surface extends in the direction of arrow 28, which is the direction of outward urging of the collet piece 20. With this particular arrangement of inclined surface 26, torsion of the tool as it rotates in contact with the workpiece tends to draw the holding portion 24 into increasingly tightened contact with the tool. Thus, as the chuck is rotated in the direction of arrow 27, and the tool is engaged with the workpiece, the tool torsion, due to the load imposed by engagement with the workpiece, tends to rotate the tool relative to the chuck in the direction of arrow 32 of FIG. 2. With inclined surface 26 oriented and positioned as illustrated in this FIG. 2, the relative rotation of tool shank 14 produces a frictional force that tends to slide the collet piece in the direction of arrow 28 to thus more tightly force the wedge into the space between outer wall of chamber 8 and tool shank 14.

Further, the center of gravity of each collet piece is displaced radially from the center of rotation of the chuck normal to the direction of arrow 28 as well as in the direction of the arrow so that the collet's natural tendency to remain stationary as the chuck accelerates (e.g. inertia of the collet) will urge the collet piece axially along its own guideway in such a sense as to grip the tool shank. It is this movement which constitutes the third component of the gripping action.

Figure 3:
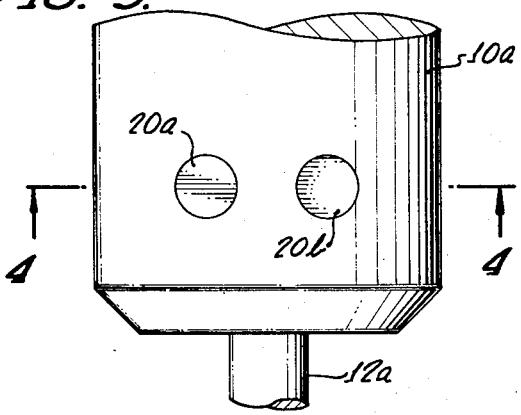
FIGS. 3 and 4 comprise elevational and sectional views of a modification of the chuck assembly of FIGS. 1 and 2.
Figure 4:
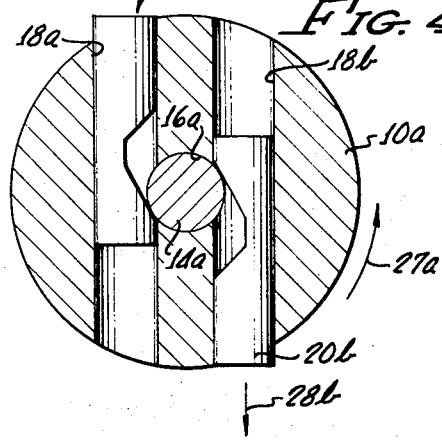

Illustrated in FIGS. 3 and 4 is a modified version of the chuck assembly of FIGS. 1 and 2. In this modified version, the various parts of the assembly are substantially identical to corresponding parts of the assembly of FIGS. 1 and 2, but differ in that a second chamber and second collet piece or centrifugally driven wedge are added. Thus, there is provided a chuck body 10a having an axial bore 16a for receiving the shank 14a of a tool 12a. The chuck is formed with a transverse substantially radially extending bore or chamber 18a intersecting tool receiving bore 16a and slidably mounting a centrifugally driven wedge 20a. All of the parts described so far, their construction and arrangement, are identical with corresponding parts of the embodiment of FIGS. 1 and 2 except for the fact that the chuck 10a is provided with a second transverse substantially radially extending chamber 18b that slidably receives a centrifugally driven wedge 20b. The latter is preferably identical to the wedge 20a, but mounted in oppositely disposed relation with respect to the wedge 20a.

As the chuck 10a rotates in the direction of arrow 27a, wedge 20a acts exactly as does wedge 20 of FIG. 1 and is centrifugally urged outwardly in the direction of arrow 28a to exert a holding force upon the tool shank 14a. Concomitantly, the second centrifugally driven wedge 20b is likewise urged substantially radially outwardly, but in the opposite direction as indicated by arrow 28b. This wedge also exerts a holding force upon the tool 14a, but in direct opposition to the holding force exerted upon the tool by the centrifugally driven wedge 20a to thereby clamp the tool between the wedges. Accordingly, gripping force upon the tool is considerably increased. In this arrangement, as in the arrangement of FIGS. 1 and 2, the centrifugally generated holding forces are supplemented by the previously described wedging actions that are due to tool torsion and chuck acceleration. Such supplemental forces are produced by action of the tool shank 14a with both of the centrifugally driven wedges 20a and 20b.

Figure 5:
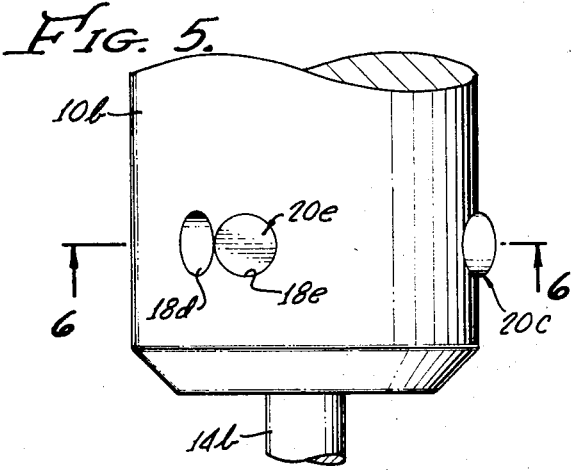
FIGS. 5 and 6 comprise elevational and sectional views of a further modification of a chuck assembly of FIGS. 1 and 2.
Figure 6:
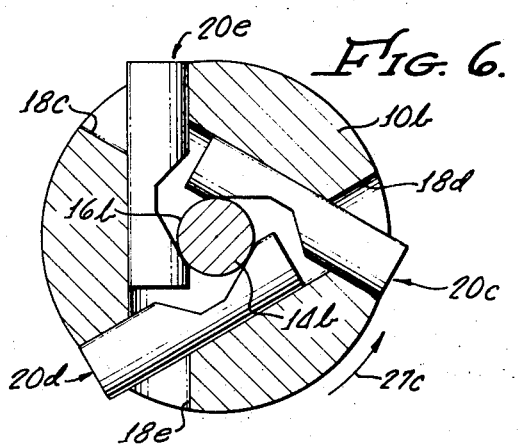

Illustrated in FIGS. 5 and 6 is an arrangement that provides for still greater increase in the rotationally derived holding forces of the wedging of collet pieces constructed in accordance with the principles of the present invention. In the embodiment of FIGS. 5 and 6, a chuck body 10b is formed with a tool receiving bore 16b in which is mounted the shank 14b of the driven tool. In this arrangement, not one, not two, but three transverse substantially radially extending chambers or bores 18c, 18d, and 18e are provided and respectively slidably mount centrifugally driven wedges 20c, 20d, and 20e. Each of these wedges acts in the same manner as does each of the wedges 20, 20a, and 20b of FIGS. 1, 2, 3 and 4, whereby each of the wedges will exert upon the tool shank 14b a centrifugally derived holding force, a torsionally derived holding force, and a holding force due to acceleration of the chuck. Thus, the total holding force is still further increased.

In the arrangements illustrated in FIGS. 3, 4, 5, and 6, the several chambers 18a, 18b, etc., formed in the chuck are shown as having a center line lying in a common plane that is normal to the rotational axis of the chuck. It will be readily appreciated that such an arrangement may be varied so as to displace the chambers from each other axially of the chuck if deemed necessary or desirable. Thus, at one point along the chuck axis, there may be provided the collet arrangement of any one of FIGS. 2, 4 or 6, and, in addition, at each of one or several additional mutually spaced points along the chuck axis, there may also be provided a collet arrangement of any one of FIGS. 2, 4 or 6.

In the previously described embodiments, after assembly and after an initial rotational operation of the driven tool, the wedging action is such that the centrifugally driven collet is frictionally retained in its wedging relation between the tool and the outer side of its confining chamber. Accordingly, the entire assembly is frictionally locked in such position. If such locking is not desirable, the wedge angle may be increased and additional retaining means (not shown in these figures) may be employed, such as, for example, resilient elements analogous to those shown and described below in connection with the embodiment of FIGS. 7 through 10. Such retaining means may provide the dual function of holding the several collet pieces in position within the chuck in the absence of any tool therein, and further may provide for holding and retaining the tool and collet pieces while the assembly is at rest.

Illustrated in FIGS. 7 through 10 is still another variation of the rotationally driven tool holding wedge embodying principles of the present invention. The embodiment of FIGS. 7 through 10 is particularly preferred from the standpoint of simplicity, reliability and ease of manufacture. As shown in FIGS. 7 through 10, the chuck body 10c is formed with a bore 16c receiving the shank 14c of a rotationally driven tool 12c. Chuck 10c is provided with a transversely extending radial chamber or bore 18f that intersects the tool receiving bore 16c and slidably receives a pair of substantially identical, but mutually opposed, centrifugally driven collets or wedges 20f and 20g. Chamber 18f may be considered as a pair of coaxial chambers having a common central portion.

For facilitating manufacturing operations, each of the centrifugally driven wedges or collets 20f and 20g as illustrated in detail in FIG. 10 has its inclined tool engaging surface 26c formed as an arcuate surface. Preferably, for maximum ease of manufacturing, this surface is a portion of a circular curve. Where the tool engaging surface 26c is formed as a portion of a circular curve, it is made with a center of curvature that is displaced considerably outwardly of the collet axis 41 in a direction normal to the surface 40 along which the inner tool engaging portion of the centrifugally driven wedge is cut. As illustrated in FIG. 10, each wedge is formed from a circular cross-section rod having a diameter substantially equal to the diameter of the bore 18f, but sufficiently small to be slidable therein. This provides an outer massive portion 22f. The rod has an inner portion cut along the surface 40 in which is formed the arcuate tool engaging surface 26a.

Where the tool engaging surface 26c is made in a circular curve, its radius of curvature is made considerably larger than the radius of the shank of the tool that is to be gripped thereby. This difference in radii is readily apparent in the cross-sectional view of FIG. 9. Having a larger radius of curvature, the surface 26a will contact the surface of the tool shank 14c at a point that is transversely offset from the center of rotation, such offset being substantially normal to the direction of outward urging of the wedge indicated by arrows 28f and 28g.

Each centrifugally driven collet is provided with a pair of shallow peripheral grooves 42, 44. Grove 42 is formed at the innermost end of the collet piece and, in effect, is a semi-circumferential shoulder on this end of the collet. Groove 44 is a semi-circumferential channel-shaped depression positioned between the inner camming portion 24f of the collet and the outer massive portion 22f thereof.

As shown in FIGS. 7, 8 and 9, the two identical but oppositely disposed collet pieces 20f and 20g are held in assembled relation by a pair of resilient O-rings 46, 48, which encircle the mating collet halves and are retained within corresponding ones of the grooves 42, 44. The O-rings are of such a size that their major diameter is greater than the diameter of bore 18f whereby, when no tool shank 14c is positioned in bore 16c between the opposing surfaces 26c of the two collet pieces, the latter are held in bore 18f by the resilient action of the O-rings. As shown in FIG. 9, when assembled with both collets at their innermost positions, the distance between midpoints of opposing tool engaging arcuate surfaces is slightly greater than the diameter of the largest tool shank to be employed.

It will be noted that the semi-circumferential groove 42 has an extent axially of the collet somewhat less than the diameter of the O-ring retained therein. As best seen in FIG. 9, the O-rings will protrude beyond the inner edge of each of the collets to contact the inwardly facing surface or edge of the outer massive portion of the mating collet piece. Consequently, the two collet pieces are urged by the resilient O-rings outwardly in much the same manner, though with considerably less force, as they are urged during rotation of the chuck to thereby lightly grip and hold the tool shank in the absence of centrifugally generated wedging action.

An alternative arrangement may entirely omit grooves 44 on the collet pieces to increase collet strength and employ only semi-circular O-rings (e.g. O-rings cut along a diameter) each held in and coextensive with one of the semi-circular grooves 42. Further, other types of resilient members, such as small springs for example, may be employed instead of the O-rings to retain the collet pieces within the chuck and to retain the tool when at rest.

The embodiment of FIGS. 7 through 10 operates in much the same manner as the previously described embodiments and provides a tool gripping force that has three mutually additive components. The first of such components is due to the outward centrifugal force acting upon the collet pieces. This is amplified by the mechanical advantage due to the angle between (a) the surface 26c at its point of tangency with the tool shank and (b) the radially outward centrifugal force on the collet. The second component is due to the tool torsion that tends to draw the camming portion 24f more tightly into wedging engagement between the tool shank and the chuck bore 18f. The third component is due to acceleration of the chuck which also tends to draw the camming portion 24f into tighter engagement with the tool and chuck.

In this arrangement as in the earlier described embodiments, the mechanical advantage due to the wedging action is a function of the angle of the inclined surface at its point of contact with the tool shank. To increase this mechanical advantage and, accordingly, to increase the gripping force for a given rotational speed, this angle is decreased. For a circular configuration of the inclined surface, the angle is changed by varying the radius of curvature of the surface or displacing the center of curvature both laterally and axially. However, decreasing the wedging angle may provide such an increased gripping force that the tool may not be readily released when the assembly is at rest. Since the relatively small spring force provided by the O-rings 46, 48, will adequately serve to retain the tool in position when inserted between the opposed collet pieces, the wedge angle may be increased to avoid undesired locking of the tool shank between the centrifugally driven wedges.

Although both the collet receiving chamber and the collet pieces are preferably formed of circular cross-section or of circular stock, it will be readily appreciated that square, rectangular or other cross-sections may be employed. If deemed necessary or desirable, when circular cross-sections are employed, the collet pieces may be keyed or splined, cooperating with mating keyway or grooves in the chamber to insure proper positioning about the axis of the collet receiving chamber. Similarly, the tool shank 14 may be of hexagonal, octagonal or other non-circular cross-section.

In each of the described embodiments the additional gripping forces, due to acceleration and torsion of the driven shaft, cause the driven shaft or tool 12a, 12b, or 12c to exert a reactive torque in opposition to chuck rotation. This reactive torque supplements the gripping force exerted by the wedge (in response to centrifugal forces) only when the chuck rotation is as indicated by the arrows in the drawing for the illustrated position of the wedge. For example, in Fig. 2 the shaft engaging surface 26 of the wedge camming portion 24 is urged in the direction of arrow 28 in response to centrifugal forces exerted by chuck rotation. In this situation the chuck rotation must be in the direction indicated by arrow 27 if the supplement forces are to add to the centrifugally generated gripping force.

The centrifugally generated gripping force is independent of direction of chuck rotation. Nevertheless, the supplemental forces described above are, in effect, unidirectional insofar as chuck rotation is concerned. They will supplement the centrifugally generated wedging action gripping force for only one direction of chuck rotation. They will oppose such gripping force should the chuck be rotated in the direction opposite to that illustrated in the drawing.

Consequently, in order to ensure application of the supplemental gripping forces, it is necessary that the chuck rotation be oriented to impart a linear velocity component (indicated by arrow 25, FIG. 2) to portions of the chuck on the same side of the shaft 12 as the wedge camming portion 24. This velocity component is directed opposite to the direction of the transverse motion (indicated by arrow 28) of the wedge camming portion in response to centrifugal forces. With this direction of chuck rotation, the reactive torque 32 exerted by shaft 12 causes the shaft to tend to slide along and relative to the surface 26, substantially in the direction of the transverse motion of the wedge as indicated by arrow 28. Friction of this incipient sliding motion tends to draw the wedge evermore tightly into position between the shaft 12 and the outer side of bore 18 and, thus exert the described supplemental forces.

There has been described an improved centrifugally operated chuck and collet assembly that makes optimum use of several forces exerted during rotation to afford a sure and firm grip upon a driven tool. Use of inclined tool engaging surfaces on the tool holding collet pieces provides for a mechanical advantage in the tool holding force.

The foregoing detailed description is to be clearly understood as given by way of illustration and example only, the spirit and scope of this invention being limited solely by the appended claims.

I claim:

1. A chuck assembly comprising:
   a chuck adapted to be rotated and to impart such rotation to a shaft extending into said chuck, said chuck having a substantially radially extending chamber therein, and a wedge mounted in said chamber for motion therein substantially radially of said chuck in response to centrifugal forces exerted on the wedge by chuck rotation, said wedge having
   an outer massive portion offset from the axis of rotation of said chuck in a direction substantially along the radial extent of said chamber, and
   an inner camming portion on one side of said wedge having a shaft engaging surface arranged to contact said shaft at an area thereof laterally offset from said axis of rotation whereby rotational reactive forces of said shaft and centrifugal forces of chuck rotation are exerted upon said wedge during rotation of said chuck to urge said wedge outwardly along the extent of said chamber, and whereby said shaft engaging surface is cammed against said shaft to urge the shaft laterally in a direction across the extent of said chamber.

2. The assembly of claim 1 including
a second wedge mounted in said chuck for slidable motion substantially radially thereof in response to centrifugal forces of chuck rotation exerted on the wedge during chuck rotation,
said second wedge having
an outer massive portion radially offset from said axis of rotation in a second direction different than said first-mentioned direction of radial offset of said massive portion of said first-mentioned wedge, and an inner camming portion on one side thereof having a shaft engaging surface arranged to contact said shaft at an area thereof laterally offset from said axis or rotation,
whereby said camming portions of said wedges cooperate to clamp said shaft therebetween.

3. The assembly of claim 2 wherein both of said wedges are mounted in said chamber, and wherein said second direction is substantially opposite to said first-mentioned direction, whereby centrifugal forces exerted during rotation of said chuck urge said wedges radially outwardly in mutually opposite directions and said shaft engaging surfaces of said two wedges are cammed against said shaft in opposition to each other.

4. The assembly of claim 2 including a second substantially radially extending chamber in said chuck, said second wedge being slidably mounted in said second chamber.

5. The assembly of claim 4 wherein said chambers are substantially parallel with each other and said shaft has a portion extending into both said chambers.

6. The assembly of claim 4 wherein said chambers are coaxial, extend through diametrically opposite portions of said chuck, and have a common section at the axis of rotation of said chuck.

7. The assembly of claim 4 including
a third substantially radially extending chamber in said chuck, and
a third wedge substantially similar to said first-mentioned and second wedges, slidably mounted in said third chamber, said chambers being substantially symmetrically disposed about the axis of rotation of said chuck and being angularly oriented with respect to each other,
whereby the camming portions of all of said wedges are cammed against said shaft during chuck rotation to collectively clamp said shaft therebetween.

8. A chuck assembly comprising:
a chuck adapted to be rotated and to impart such rotation to a member extending into said chuck, and a centrifugally driven wedge mounted in said chuck for exerting a transverse holding force upon said member,
said wedge comprising
an outer massive portion displaced from the axis of rotation of said chuck so as to be urged outwardly upon chuck rotation, and
a holding portion connected to said massive portion and having a camming surface on one side thereof inclined to the direction of outward urging of said massive portion to exert said holding force by wedging action in a direction that is angularly oriented with respect to said direction of outward urging of said massive portion.

9. The assembly of claim 8 wherein the mounting of said wedge in said chuck comprises
a substantially radially extending chamber formed in said chuck,
said wedge being slidably mounted in said chamber so as to be urged radially of said chuck upon chuck rotation.

10. The assembly of claim 9 including
a second centrifugally driven wedge substantially identical to said first-mentioned wedge,
said second wedge being oppositely disposed relative to said first wedge and slidably mounted in said chamber so as to be urged outwardly in a direction opposite the outward urging of said first-mentioned wedge,
whereby said wedges exert mutually opposed transverse holding forces upon opposite sides of said member.

11. The assembly of claim 10 wherein said camming surface of each of said wedges comprises an arcuate surface having a radius of curvature greater than the radius of that portion of the member extending into said chuck.

12. The assembly of claim 8 wherein said camming surface inclines outwardly in the direction of said urging of said massive portion, whereby both torsion of said member as it rotates in contact with a workpiece and acceleration of said chuck to rotational speed tend to draw said holding portion into increasingly tightened contact with said member to thereby supplement holding action due to centrifugal forces.

13. A chuck assembly comprising:
a chuck body having
an axial bore therein, a transverse bore extending through said chuck body and intersecting said axial bore, a pair of mutually opposed centrifugally driven holding wedges slidably mounted within said transverse bore, each of said centrifugally driven wedges comprising
an enlarged outer portion substantially filling said transverse bore at one end thereof, and an inner camming portion extending axially of said transverse bore from said enlarged outer portion to a point in said bore beyond the axis of rotation of said chuck and closely adjacent the inner edge of the enlarged outer portion of the other of said wedges,
said inner portion having a width not substantially greater than one-half the width of said transverse bore and being formed with an inwardly facing inclined cam surface on one side thereof positioned to be engaged by a member within said axial bore at a point laterally offset from the axial extent of said transverse bore.

14. The chuck assembly of claim 13 including means for resiliently retaining said centrifugally driven wedges within said transverse bore and for urging said centrifugally driven wedges away from each other in a direction along the axial extent of said transverse bore.

15. The assembly of claim 14 wherein said means for urging said wedges comprises
a pair of O-rings between said wedges,
each said O-ring having a portion thereof positioned between an end of the inner portion of one wedge and the inner edge of the enlarged outer portion of the other wedge.

16. The chuck assembly of claim 13 wherein said inclined surface of each of said wedges comprises
a portion of a circular arc having
a radius of curvature greater than the radius of curvature of that portion of a member received in said axial bore.

17. A chuck assembly comprising
a chuck adapted to be rotated in a predetermined direction and to impart such rotation to a driven shaft extending into said chuck, whereby said shaft exerts a reactive torque in opposition to chuck rotation, and
a centrifugally driven wedge mounted in said chuck for exerting a holding force upon said shaft, said wedge comprising
a wedge camming portion movably mounted in said chuck for motion transverse to said shaft in response to centrifugal forces exerted by said chuck rotation, said wedge camming portion having a shaft engaging surface on one side thereof inclined to the direction of said transverse motion and arranged to contact said shaft to exert a gripping force upon said shaft, said predetermined direction of chuck rotation being oriented to impart a velocity component to portions of the chuck on the same side of the shaft as said wedge camming portion, said velocity component being directed opposite to the direction of said transverse motion of said wedge camming portion in response to centrifugal forces, whereby said reactive torque causes said shaft to tend to slide along said shaft engaging surface relative thereto substantially in the direction of said transverse motion of said wedge camming portion to thereby supplement the shaft gripping force exerted in response to centrifugal forces.

18. The assembly of claim 17 wherein the mounting of said wedge in said chuck comprises
a chamber formed in said chuck and extending transversely of the axis of rotation of said chuck,
said chamber having an axis displaced from said axis of rotation,
said wedge being slidably mounted in said chamber so as to be urged outwardly in a direction transverse to said shaft upon chuck rotation.

19. The assembly of claim 18 including
a second centrifugally driven wedge substantially identical to said first-mentioned wedge,
said second wedge being oppositely disposed relative to said first wedge and slidably mounted in said chamber so as to be urged outwardly in a direction opposite the outward urging of said first-mentioned wedge,
whereby said wedges exert mutually opposed transverse holding forces upon opposite sides of said shaft.

20. The assembly of claim 2 wherein both said wedges lie in a common plane that is normal to the axis of rotation of said chuck.

21. The assembly of claim 2 wherein the camming portions of respective wedges lie on opposite sides of a plane containing the axis of rotation of said chuck and extending substantially parallel to said direction of outward urging of said massive portions.

22. The assembly of claim 21 wherein both said wedges lie in a common plane that is normal to the axis of rotation of said chuck.

23. The assembly of claim 10 wherein the holding portions of respective wedges lie on opposite sides of a plane containing the axis of rotation of said chuck and extending substantially parallel to said direction of outward urging of said massive portions.

24. The assembly of claim 19 wherein both said wedges lie in a common plane that is normal to the axis of rotation of said chuck.

25. A chuck assembly comprising
a body adapted to be rotated about an axis and to impart such rotation to a member extending axially into said body, said body having a substantially transversely extending chamber therein, and
a pair of wedges mounted in said chamber for motion therein in mutually opposite directions outwardly of said body in response to centrifugal forces exerted on the wedges by rotation of said body, each said wedge having
an outer massive portion offset from the axis of rotation of said body in a direction substantially along the extent of said chamber, and
an inner camming portion having a camming surface, said camming portions of respective ones of said wedges being positioned on respectively opposite sides of a plane containing said axis of rotation and extending substantially parallel to said directions of outward urging of said wedges.

26. The chuck assembly of claim 25 wherein said camming surfaces are each centered in a common plane that extends normal to the axis of rotation of said chuck whereby transverse force exerted by one of said wedges is reacted against a corresponding force exerted by the other of said wedges.

* * * * *